(12) United States Patent
Wang et al.

(10) Patent No.: US 11,218,070 B2
(45) Date of Patent: Jan. 4, 2022

(54) SNUBBER MODULE, SNUBBER APPARATUS AND POWER CONVERSION APPARATUS

(71) Applicant: FUJI ELECTRIC CO., LTD., Kanagawa (JP)

(72) Inventors: Qichen Wang, Hino (JP); Ryuji Yamada, Hachioji (JP)

(73) Assignee: FUJI ELECTRIC CO., LTD., Kanagawa (JP)

(*) Notice: Subject to any disclaimer, the term of this patent is extended or adjusted under 35 U.S.C. 154(b) by 30 days.

(21) Appl. No.: 16/799,660

(22) Filed: Feb. 24, 2020

(65) Prior Publication Data
US 2020/0295652 A1 Sep. 17, 2020

(30) Foreign Application Priority Data

Mar. 13, 2019 (JP) .............................. JP2019-045342

(51) Int. Cl.
*H02M 1/34* (2007.01)
*H02M 7/5387* (2007.01)
*H02M 7/00* (2006.01)

(52) U.S. Cl.
CPC ............. *H02M 1/34* (2013.01); *H02M 7/003* (2013.01); *H02M 7/53871* (2013.01); *H02M 1/342* (2021.05)

(58) Field of Classification Search
CPC ........ H02M 1/34; H02M 1/342; H02M 7/003; H02M 7/5387; H02M 7/53871
See application file for complete search history.

(56) References Cited

U.S. PATENT DOCUMENTS 9,893,643 B1  2/2018 Honda
2006/0018074 A1* 1/2006 Inoue .................... H02H 9/041
                                                    361/118
(Continued)

FOREIGN PATENT DOCUMENTS

JP    2000102241 A    4/2000
JP    2000152603 A    5/2000
(Continued)

OTHER PUBLICATIONS

Office Action issued for counterpart Japanese Application No. 2019-045342, issued by the Japanese Patent Office dated Apr. 16, 2019 (drafted on Apr. 9, 2019).
(Continued)

*Primary Examiner* — Adolf D Berhane

(57) ABSTRACT

A snubber module is provided, which constitutes a snubber apparatus attachable to a terminal of a semiconductor module. The snubber module includes: a positive-side capacitor, a first diode and a negative-side capacitor sequentially connected between a positive-side snubber terminal and a negative-side snubber terminal, the positive-side snubber terminal connectable to a positive-side terminal of the semiconductor module, and the negative-side snubber terminal connectable to a negative-side terminal of the semiconductor module; a first coupling terminal directly or indirectly connected to one node of either a first node between the positive-side capacitor and the first diode or a second node between the negative-side capacitor and the first diode; and a housing accommodating the positive-side capacitor, the negative-side capacitor and the first diode, and having provided therein the positive-side snubber terminal, the negative-side snubber terminal and the first coupling terminal in a manner enabling external connection.

9 Claims, 13 Drawing Sheets

(56) References Cited

U.S. PATENT DOCUMENTS

| | | |
|---|---|---|
| 2012/0019970 A1 | 1/2012 | Nagano |
| 2019/0206810 A1* | 7/2019 | Kanai ................... H01L 23/345 |
| 2020/0244158 A1* | 7/2020 | Yamada ................ H02M 7/003 |
| 2020/0286864 A1* | 9/2020 | Horiguchi ............... H01L 24/48 |

FOREIGN PATENT DOCUMENTS

| | | |
|---|---|---|
| JP | 2009077518 A | 4/2009 |
| JP | 2010098846 A | 4/2010 |
| JP | 2012029373 A | 2/2012 |
| JP | 2012095473 A | 5/2012 |
| JP | 2016144340 A | 8/2016 |
| JP | 2018085782 A | 5/2018 |

OTHER PUBLICATIONS

Office Action issued for counterpart Japanese Application No. 2019-045342, issued by the Japanese Patent Office dated Jul. 16, 2019 (drafted on Jul. 11, 2019).

Office Action issued for counterpart Japanese Application No. 2019-045342, issued by the Japanese Patent Office dated Oct. 8, 2019 (drafted on Oct. 2, 2019).

Office Action issued for counterpart Japanese Application No. 2019-220883, issued by the Japanese Patent Office dated Dec. 8, 2020 (drafted on Dec. 1, 2020).

* cited by examiner

SNUBBER MODULE, SNUBBER APPARATUS AND POWER CONVERSION APPARATUS

The contents of the following Japanese patent application(s) are incorporated herein by reference:
2019-045342 filed in JP on Mar. 13, 2019

BACKGROUND

1. Technical Field

The present invention relates to snubber modules, snubber apparatuses and power conversion apparatuses.

2. Related Art

In the prior art, various techniques to prevent destruction of a device due to voltage overshoot are proposed, (see Patent Documents 1 and 2, for example). For example, a snubber apparatus in which a plurality of devices are connected is proposed in Patent Document 1.

Patent Document 1: Japanese Patent Application Publication No. 2016-144340
Patent Document 2: Japanese Patent Application Publication No. 2012-95473

However, when a plurality of devices are connected to form a snubber apparatus, it takes time and effort to assemble and attach the snubber apparatus.

SUMMARY

Item 1

To solve the problem above, according to a first aspect of the present invention, provided is a snubber module constituting a snubber apparatus attachable to a terminal of a semiconductor module. The snubber module may include a positive-side capacitor, a first diode and a negative-side capacitor sequentially connected between a positive-side snubber terminal and a negative-side snubber terminal, where the positive-side snubber terminal is connectable to a positive-side terminal of the semiconductor module, and the negative-side snubber terminal is connectable to a negative-side terminal of the semiconductor module. The snubber module may include a first coupling terminal directly or indirectly connected to one node of either a first node or a second node, where the first node is located between the positive-side capacitor and the first diode, and the second node is located between the negative-side capacitor and the first diode. The snubber module may include a housing accommodating the positive-side capacitor, the negative-side capacitor and the first diode, and having provided therein the positive-side snubber terminal, the negative-side snubber terminal and the first coupling terminal in a manner enabling external connection.

Item 2

The snubber module may further include a second diode provided between the one node and the first coupling terminal and allowing current to flow in a direction from the negative-side terminal to the positive-side terminal.

Item 3

The snubber module may further include a second coupling terminal directly or indirectly connected to another node of the first node and the second node that is different from the one node.

Item 4

The snubber module may further include a third diode provided between the other node and the second coupling terminal and allowing current to flow in a direction from the negative-side terminal to the positive-side terminal.

Item 5

At least one of the first coupling terminal and the second coupling terminal may be pulled out of the housing via an electric wire.

Item 6

The snubber module may further include a fourth diode provided along a path joining another node and the positive-side snubber terminal or the negative-side snubber terminal with the one node interposed, and allowing current to flow in a direction from the negative-side terminal to the positive-side terminal, where the other node is one of the first node and the second node that is different from the one node.

Item 7

According to a second aspect of the present invention, a snubber apparatus is provided. The snubber apparatus may include at least one snubber module according to the first aspect.

Item 8

According to a third aspect of the present invention, a snubber apparatus is provided. The snubber apparatus may include at least one snubber module according to item 1 or 2; and at least one snubber module according to any one of items 3 to 5. The respective snubber modules may be sequentially connected via the first coupling terminal and the second coupling terminal.

Item 9

The snubber apparatus may include a plurality of charge paths parallel to one another and each allowing current to flow in a direction from the positive-side terminal to the negative-side terminal. The snubber apparatus may include a plurality of discharge paths parallel to one another and each allowing current to flow in a direction from the negative-side terminal to the positive-side terminal. A wiring inductance of each of the discharge paths may be greater than a wiring inductance in each of the charge paths.

Item 10

According to a fourth aspect of the present invention, a power conversion apparatus is provided. The power conversion apparatus may include a semiconductor module. The power conversion apparatus may include a snubber apparatus according to the second aspect or the third aspect.

The summary clause does not necessarily describe all necessary features of the embodiments of the present invention. The present invention may also be a sub-combination of the features described above.

BRIEF DESCRIPTION OF THE DRAWINGS

FIG. 3 shows a current flow occurring when the switching device 11 is turned on.

DESCRIPTION OF EXEMPLARY EMBODIMENTS

Hereinafter, the present invention will be described with reference to embodiments of the invention. However, the following embodiments should not to be construed as limiting the claimed invention. Also, all the combinations of the features described in the embodiment(s) are not necessarily essential for solution provided by the invention.

1. Circuit Configuration of Semiconductor Apparatus 1

Figure 1:
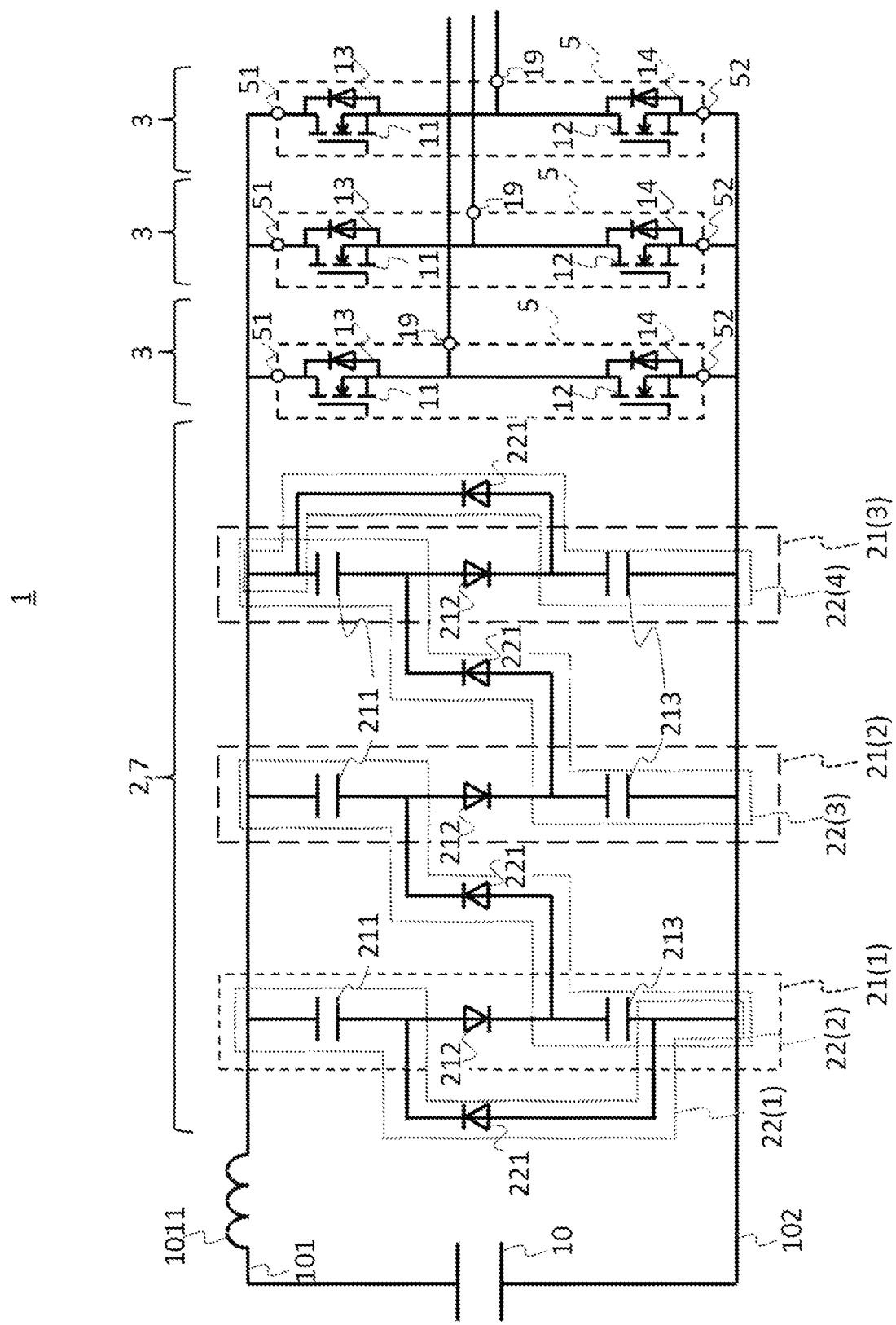
FIG. 1 is a circuit diagram of a power conversion apparatus 1 according to this embodiment.

FIG. 1 is a circuit diagram of a semiconductor apparatus 1 according to this embodiment. The semiconductor apparatus 1, which is one example of a power conversion apparatus, converts DC power to multiple-phase (for example, three phases in this embodiment) AC power. The semiconductor apparatus 1 switches a connection between each of the electrodes of a capacitor 10 and a power output terminal 19 to convert voltage, so that the voltage is output at the power output terminal 19. Note that the return path of the output alternating current may be the power output terminal 19 for another phase. An inductive load (not shown) may be connected to the power output terminal 19. The semiconductor apparatus 1 includes the capacitor 10, the one or more switching circuits 3 (for example, one switching circuit per phase; thus, there is a total of three switching circuits in this embodiment) and the snubber circuit 2. Note that the semiconductor apparatus 1 may convert DC power to single-phase AC power. In this case, the semiconductor apparatus 1 may include only one switching circuit 3 and include two capacitors 10 connected in series, and a return path of the alternating current output at the power output terminal 19 may be the middle point of the capacitor 10.

The capacitor 10 serves as a DC power supply. A positive-side power supply line 101 is connected to the positive electrode of the capacitor 10, and a negative-side power supply line 102 is connected to the negative electrode of the capacitor 10. A wiring inductance 1011 can be developed in the positive-side power supply line 101 and the negative-side power supply line 102 according to their respective wire lengths. Note that although a single capacitor 10 is shown in FIG. 1, the semiconductor apparatus 1 may include a plurality of capacitors 10 connected in series or in parallel. The capacitor 10 may be a smoothing capacitor to smooth voltage between the positive-side power supply line 101 and the negative-side power supply line 102. In this case, an additional power supply which is not shown in the figure may be connected between the positive-side power supply line 101 and the negative-side power supply line 102.

1.1. Switching Circuit 3

Each of the switching circuits 3 has switching devices 11 and 12 and freewheeling diodes 13 and 14.

The switching devices 11 and 12 are connected in series between the positive-side power supply line 101 and the negative-side power supply line 102 with the switching device 11 located on the positive side and the switching device 12 on the negative side. The switching devices 11 and 12 may constitute an upper arm and a lower arm of the semiconductor apparatus 1.

The drain terminal of each of the switching devices 11 and 12 is connected to the positive-side power supply line 101 and the source terminal is connected to the negative-side power supply line 102. A gate drive circuit which is not shown in the figure is connected to the gate terminal of each of the switching devices 11 and 12 to perform on/off control on the switching devices 11 and 12. For example, the switching devices 11 and 12 may be controlled to be alternatively in connected state, with a dead-time interval during which the both devices are in the off state being interposed. The switching devices 11 and 12 may be controlled in the PWM scheme. The power output terminal 19 is connected to the middle point between the switching device 11 and the switching device 12.

The switching devices 11 and 12 may be silicon semiconductor devices of which the base material is silicon, or may be wide bandgap semiconductor devices. Wide bandgap semiconductor devices are semiconductor devices having a wider bandgap than silicon semiconductor devices and containing SiC, GaN, a diamond, a gallium nitride-based material, a gallium oxide-based material, AlN, AlGaN, ZnO or the like, for example Note that the switching devices 11 and 12 may be MOSFETs, or may be semiconductor devices having other structures, such as an IGBT or a bipolar transistor.

The freewheeling diodes 13 and 14 are connected in anti-parallel to the switching devices 11 and 12 such that the the positive-side power supply line 101 serves as a cathode. The freewheeling diodes 13 and 14 may be Schottky barrier diodes. Alternatively, the freewheeling diodes 13 and 14 may be body diodes of the switching devices 11 and 12. The freewheeling diodes 13 and 14 may be silicon semiconductor devices, or may be wide bandgap semiconductor devices.

Each of the switching circuits 3 may be formed as a module as a semiconductor module 5. In this case, the drain terminal of the switching device 11, which is in the positive side, may be a positive-side terminal 51 of the semiconductor module 5, and the source terminal of the switching device 12, which is in the negative side, may be a negative-side terminal 52 of the semiconductor module 5.

1.2. Snubber Circuit 2

The snubber circuit 2 absorbs voltage overshoot caused when the switching devices 11 and 12 cut current off, to protect the respective devices in the semiconductor apparatus 1. The snubber circuit 2 may be implemented as a snubber apparatus 7 attachable to the positive-side terminal 51 and the negative-side terminal 52 of the semiconductor module 5.

The snubber circuit 2 has n charge paths 21 parallel to one another and n+1 discharge paths 22 parallel to one another. Note that the number n is an integer greater than or equal to 1, and in this embodiment, n=3, for example. Further, in this embodiment, the three charge paths 21 are referred to, starting from the left side of the figure, as: a first charge path 21(1); a second charge path 21(2); and a third charge path 21(3) as one example for description. Also, the four discharge paths 22 are referred to, starting from the left side of the figure, as: a first discharge path 22(1); a second discharge path 22(2); a third discharge path 22(3); and a fourth discharge path 22(4) for description.

Each charge path 21 has a positive-side capacitor 211, a charge path diode 212 and a negative-side capacitor 213 connected sequentially and in series between the positive-side terminal 51 and the negative-side terminal 52. The positive-side capacitor 211 and the negative-side capacitor 213 each serve as a snubber capacitor, and may absorb transient voltage overshoot caused at the time of activation of the switching devices 11 and 12 (the voltage overshoot applied to the devices for a period of longer than 10 ns and shorter than 10 μs, for example). For example, the positive-side capacitor 211 and the negative-side capacitor 213 can suppress oscillation of which the frequency is greater than 100 kHz and less than 100 MHz. The positive-side capacitor 211 and the negative-side capacitor 213 may be film capacitors or multi-layer ceramic chip capacitors, for example The charge path diode 212 is arranged with its anode facing the positive-side terminal 51 and its cathode facing the negative-side terminal 52. This allows current to flow through each charge path 21 from the positive-side terminal 51 to the negative-side terminal 52.

Each discharge path 22 has a discharge path diode 221. The discharge path diode 221 is connected between the negative-side terminal 52 or the negative-side capacitor 213 in the $N^{th}$ charge path 21 of the n charge paths 21 (where N is an integer and 0≤N≤n) and the positive-side capacitor 211 in the $(N+1)^{th}$ charge path 21 of the n charge paths 21 or the positive-side terminal 51. For example, the discharge path diode 221 in the first discharge path 22(1) is connected between the negative-side terminal 52 and the positive-side capacitor 211 in the first charge path 21(1). The discharge path diode 221 in the second discharge path 22(2) is connected between the negative-side capacitor 213 in the first charge path 21(1) and the positive-side capacitor 211 in the second charge path 21(2). The discharge path diode 221 in the third discharge path 22(3) is connected between the negative-side capacitor 213 in the second charge path 21(2) and the positive-side capacitor 211 in the third charge path 21(3). The discharge path diode 221 in the fourth discharge path 22(4) is connected between the negative-side capacitor 213 in the third charge path 21(3) and the positive-side terminal 51. The discharge path diode 221 is arranged with its anode facing the $N^{th}$ charge path 21(N) or the negative-side terminal 52 and its cathode facing the $(N+1)^{th}$ charge path 21 (N+1) or the positive-side terminal 51. This allows current to flow through each discharge path 22 in the direction from the negative-side terminal 52 to the positive-side terminal 51 via at least one of the negative-side capacitor 213 and the positive-side capacitor 211.

1.3. Behavior of Snubber Circuit 2

The following describes how the snubber circuit 2 behaves. Note that, to simplify the description of this embodiment, activation of one switching device 11 will be described.

First, a behavior is described for the case where the switching device 11 is in the on-state and the switching device 12 is in the off-state before the switching device 11 is turned off. When the switching device 11 is in the on-state and the switching device 12 is in the off-state, output current flows through the path passing the capacitor 10, the positive-side power supply line 101, the switching device 11 and the power output terminal 19. Under the circumstance, the output current flows through the wiring inductance 1011, in which energy is stored.

Figure 2:
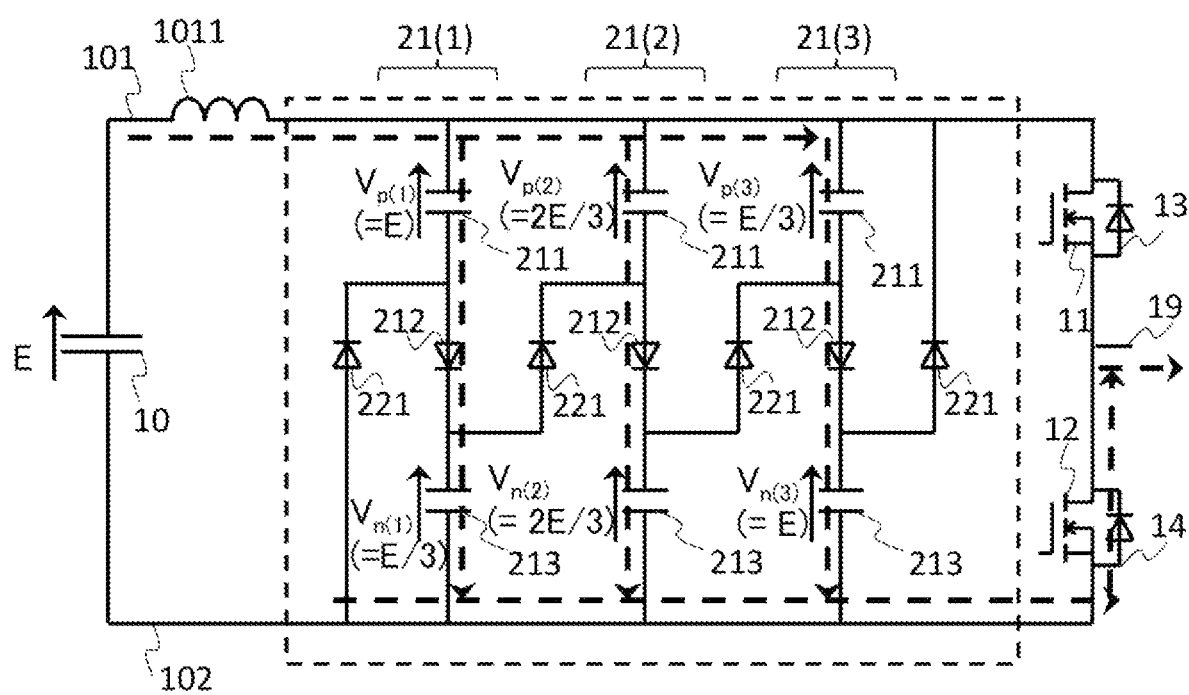
FIG. 2 shows a current flow occurring when a switching device 11 is turned off.

FIG. 2 shows a current flow occurring when the switching device 11 is turned off under this circumstance. Note that the dashed arrows in the figure represent flows of current, and solid arrows represent voltages of the capacitor 10, the positive-side capacitor 211 and the negative-side capacitor 213.

When the switching device 11 is turned off, the output current is commutated, and flows from the capacitor 10 and the positive-side power supply line 101 to the positive-side capacitor 211, the charge path diode 212 and the negative-side capacitor 213 in each charge path 21, and is output at the power output terminal 19 through the freewheeling diode 14. This causes the current energy of the wiring inductance 1011 to be absorbed as a result of charging the positive-side capacitor 211 and the negative-side capacitor 213 in the charge path 21. Eventually, the output current is fully commutated to the path passing the capacitor 10, the negative-side power supply line 102, the freewheeling diode 14 and the power output terminal 19. In this way, the commutation associated with the turn-off behavior of the switching device 11 is completed.

Figure 3:
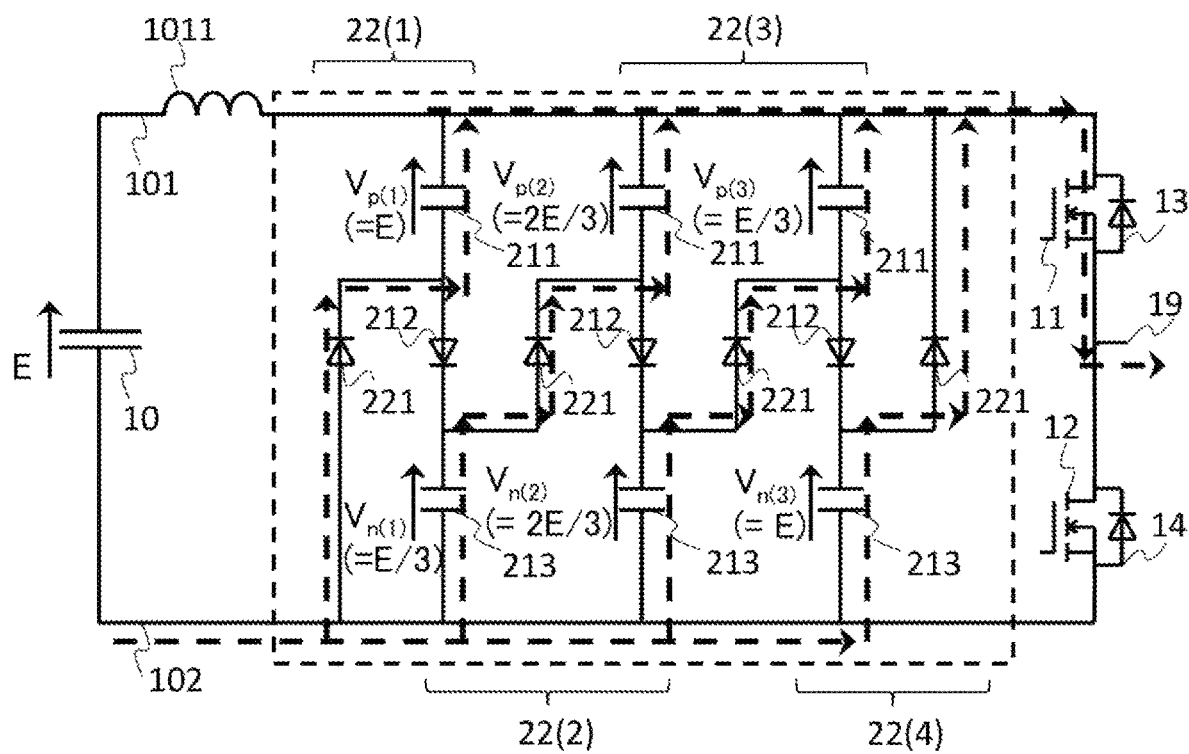

FIG. 3 shows a current flow occurring when the switching device 11 is turned on again under the circumstance where the turn-off behavior of the switching device 11 is completed.

When the switching device 11 is turned on again, the output current which has so far flowed through the path passing the capacitor 10, the negative-side power supply line 102, the freewheeling diode 14 and the power output terminal 19 is commutated to the path passing the capacitor 10, the negative-side power supply line 102, the discharge path diode 221 in each discharge path 22, the switching device 11 and the power output terminal 19, while energy during the turn-off behavior is released, where the energy has been stored in the positive-side capacitor 211 on the anode side of the discharge path diode 221 and/or in the negative-side capacitor 213 on the cathode side. Eventually, the output current is fully commutated to the path passing the capacitor 10, the positive-side power supply line 101, the switching device 11 and the power output terminal 19. In this way, the commutation associated with the turn-on behavior of the switching device 11 is completed.

Now, voltages of the positive-side capacitor 211 and the negative-side capacitor 213 during turn-off and turn-on behaviors of the switching device 11 are described. The relationship between voltages of the positive-side capacitor 211 and the negative-side capacitor 213 in each charge path 21 during the turn-off behavior is expressed by the following formula (1). In the formula, E stands for a voltage of the capacitor 10 and $V_{dc\text{-}off}$ stands for a voltage between the positive-side terminal 51 and the negative-side terminal 52 during the turn-off behavior. Further, $V_{p(1)}$ to $V_{p(3)}$ stand for voltages of the positive-side capacitors 211 in the first charge path 21(1) to the third charge path 21(3). $V_{n(1)}$ to $V_{n(3)}$ stand for voltages of the negative-side capacitors 213 in the first charge path 21(1) to the third charge path 21(3).

$$E \le (V_{p(1)} + V_{n(1)}) = (V_{p(2)} + V_{n(2)}) = (V_{p(3)} + V_{n(3)}) = V_{dc\text{-}off} \quad (1)$$

Further, the relationship between voltages of the positive-side capacitor 211 and the negative-side capacitor 213 in each charge path 21 during the turn-on behavior is expressed by the following formula (2). In the formula, $V_{dc\text{-}on}$ stands for a voltage between the positive-side terminal 51 and the negative-side terminal 52 during the turn-on behavior.

$$E \ge V_{p(1)} = (V_{n(1)} + V_{p(2)}) = (V_{n(2)} + V_{p(3)}) = V_{n(3)} = V_{dc\text{-}on} \quad (2)$$

Based on formulas (1) and (2), the relationship between the voltages of each positive-side capacitor 211 and each negative-side capacitor 213 is expressed by the following formula (3) (see the voltages shown in FIG. 2 and FIG. 3). In the formula, Vdc stands for a voltage between the positive-side terminal 51 and the negative-side terminal 52 in the steady state.

$$E = V_{dc} \approx V_{p(1)} = V_{n(3)} = 1.5 \times V_{p(2)} = 1.5 \times V_{n(2)} = 3 \times V_{n(1)} = 3 \times V_{p(3)} \quad (3)$$

According to formula (3), when the capacitor current is cut off, the charging voltage in each charge path 21 (for example, 4E/3 in FIG. 3) is higher than the discharging voltage in each discharge path 22 (for example, E in FIG. 3). Note that when the output current flows in the opposite direction, the similar effect is obtained for the turn-on and turn-off behaviors of the switching device 12 due to the symmetry of the circuit, and the detailed description is omitted for that case.

The snubber circuit 2 in the semiconductor apparatus 1 as described above includes n charge paths 21 parallel to each other and each having the positive-side capacitor 211 and the negative-side capacitor 213. Accordingly, when the semiconductor module 5 cuts off current, the energy stored in the wiring inductance 1011 passes through each charge path 21 to charge the positive-side capacitor 211 and the negative-side capacitor 213 to a voltage higher than that between the positive-side terminal 51 and the negative-side terminal 52. In this way, device destruction due to voltage overshoot is prevented.

The snubber circuit 2 also includes n+1 discharge paths 22 each for flowing current in the direction from the negative-side terminal 52 to the positive-side terminal 51 via at least one of the negative-side capacitor 213 and the positive-side capacitor 211. Accordingly, when the semiconductor module 5 applies current, the energy stored in the positive-side capacitor 211 and the negative-side capacitor 213 is discharged, and the discharging voltage in each discharge path 22 decreases to the voltage between the positive-side terminal 51 and the negative-side terminal 52.

In this context, the charging voltage in each of the n charge paths 21 developed when current is cut off is higher than the discharging voltage in each of the discharge paths 22, and energy involved in charging the charge paths 21 by cutting the current off cannot further charge the charge paths 21 even if the energy is discharged through the discharge paths 22. Therefore, the energy involved in charging the positive-side capacitor 211 and the negative-side capacitor 213 when current is cut off is charged and discharged through the resonance behavior between the wiring inductance 1011 and the positive-side and negative-side capacitors 211, 213 to be stored in the positive-side capacitor 211 and the negative-side capacitor 213 for regeneration, without being consumed as circuit loss. This reduces the circuit loss due to the resonance behavior.

In this way, in addition to the prevention of device destruction due to the voltage overshoot during current cut-off, the circuit loss can be reduced, allowing a larger permissible value of the wiring inductance connected to the positive-side terminal 51 and the negative-side terminal 52. Namely, the wire lengths of the positive-side power supply line 101 and the negative-side power supply line 102 can be changed with high flexibility.

2. Circuit Configuration of Snubber Module 70

Figure 4:
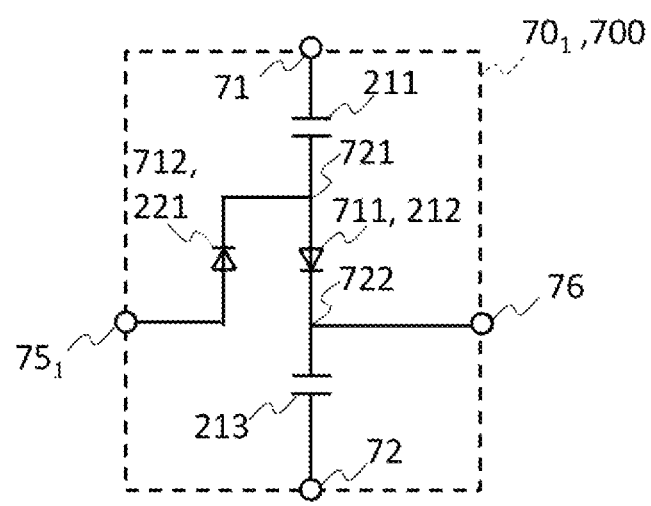
FIG. 4 shows a snubber module $70_1$ according to a first configuration example.
Figure 5:
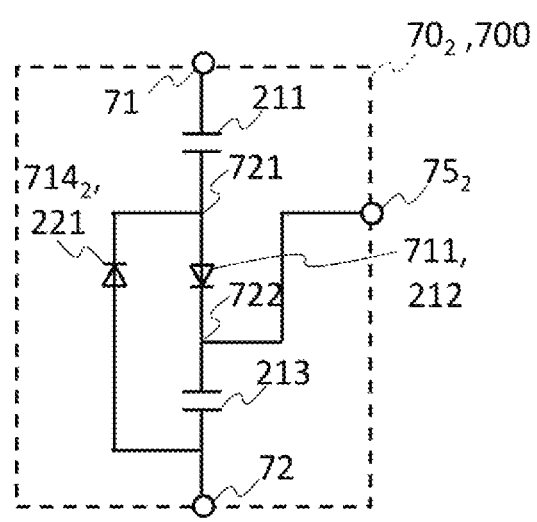
FIG. 5 shows a snubber module $70_2$ according to a second configuration example.
Figure 6:
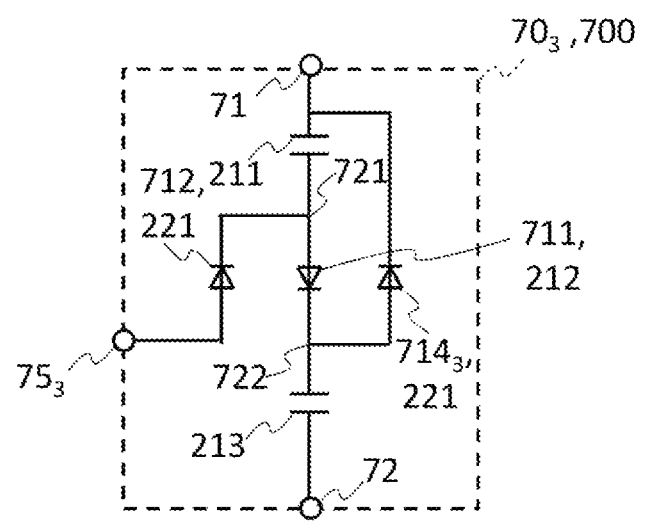
FIG. 6 shows a snubber module $70_3$ according to a third configuration example.

FIGS. 4 to 6 show the snubber module 70 according to a first configuration example to a third configuration example. The snubber apparatus 7 may include at least one snubber module 70. Note that in this embodiment, the snubber module 70 and components thereof are distinguished using subscripts of "1" to "3" as appropriate for description, which are the numbers allocated to the configuration examples.

2-1. Configuration Example (1)

FIG. 4 shows the snubber module $70_1$ according to the first configuration example The snubber module $70_1$ is alone used in the snubber apparatus 7, or is connected to the upstream side (for example, the left side of the figure in this embodiment) or the downstream side (for example, the right side of the figure in this embodiment) of any of the snubber modules $70_1$ to $70_3$.

The snubber module $70_1$ includes a positive-side snubber terminal 71, a negative-side snubber terminal 72, the positive-side capacitor 211, a first diode 711, the negative-side capacitor 213, a first coupling terminal $75_1$, a second coupling terminal 76, a second diode 712 and an housing 700.

The positive-side snubber terminal 71 is connected to the positive-side terminal 51. The negative-side snubber terminal 72 is connected to the negative-side terminal 52.

The positive-side capacitor 211, the first diode 711 and the negative-side capacitor 213 are sequentially connected between the positive-side snubber terminal 71 and the negative-side snubber terminal 72. The positive-side capacitor 211 and the negative-side capacitor 213 each serve as a snubber capacitor. The first diode 711 may allow current to flow in the direction from the positive-side terminal 51 and the negative-side terminal 52 and serves as the charge path diode 212. Here, the node between the positive-side capacitor 211 and the first diode 711 is referred to as a first node 721, and the node between the negative-side capacitor 213 and the first diode 711 is referred to as a second node 722.

For example, the first coupling terminal $75_1$ is directly or indirectly connected to the first node 721 located between the positive-side capacitor 211 and the first diode 711 in this embodiment. The first coupling terminal $75_1$, which is a negative-side coupling terminal, may be connected to the negative-side terminal 52, or may be connected to the negative-side snubber terminal 72. Further, when the plurality of snubber modules 70 are connected in a cascade manner, the first coupling terminal $75_1$ may be connected to the coupling terminal of another snubber module 70 (for example, a first coupling terminal $75_2$ of the snubber module $70_2$ or a second coupling terminal 76 of the snubber module $70_1$ in this embodiment).

For example, the second coupling terminal 76 is directly or indirectly connected to the second node 722 located between the negative-side capacitor 213 and the first diode 711 in this embodiment. The second coupling terminal 76, which is a positive-side coupling terminal, may be connected to the positive-side terminal 51, or may be connected to the positive-side snubber terminal. Further, when the plurality of snubber modules 70 are connected in a cascade manner, the second coupling terminal 76 may be connected to the coupling terminal of another snubber module 70 (for example, a first coupling terminal $75_3$ of the snubber module $70_3$ or a first coupling terminal $75_1$ of the snubber module $70_1$ in this embodiment). Note that indirect connection of the first coupling terminal $75_1$ or the second coupling terminal 76 to the first node 721 or the second node may mean coupling via a diode which allows current to flow in the direction from the negative-side terminal 52 to the positive-side terminal 51.

The second diode 712 is provided between the first node 721 and the first coupling terminal $75_1$. The second diode 712 may allow current to flow in the direction from the negative-side terminal 52 to the positive-side terminal 51 and serves as the discharge path diode 221. For example, the second diode 712 allows current to flow in the direction from the first coupling terminal $75_1$ to the first node 721 in this embodiment.

Note that the second diode 712 may not necessarily be included in the snubber module $70_1$. The second diode 712 may be externally connected to the first coupling terminal $75_1$.

The housing 700 accommodates at least the positive-side capacitor 211, the negative-side capacitor 213 and the first diode 711. For example, it accommodates the respective devices of the snubber module 70 in this embodiment. In the housing 700, at least the positive-side snubber terminal 71, the negative-side snubber terminal 72 and the first coupling terminal $75_1$ are provided in a manner enabling external connection, and in this embodiment, for example, each terminal of the snubber module 70 is provided in a manner enabling external connection. Here, being provided in a manner enabling external connection may mean that the terminal is exposed to the outside, or the terminal is pulled out to the outside.

2-2. Configuration Example (2)

FIG. 5 shows the snubber module $70_2$ according to the second configuration example The snubber module $70_2$ is alone used in the snubber apparatus 7, or is connected to the upstream side of the snubber modules $70_1$ and $70_3$ (for example, the left side of the figure in this embodiment). Note that description of configuration similar to that of the snubber module $70_1$ is omitted as appropriate.

The snubber module $70_2$ has the first coupling terminal $75_2$ and a fourth diode $714_2$. For example, the first coupling terminal $75_2$ is directly or indirectly connected to the second node 722 located between the negative-side capacitor 213 and the first diode 711 in this embodiment. This first coupling terminal $75_2$, which is a positive-side coupling terminal, may be connected to the positive-side terminal 51. Further, when the plurality of snubber modules 70 are connected in a cascade manner, the first coupling terminal $75_2$ may be connected to the negative-side coupling terminal of another snubber module 70 (for example, the first coupling terminal $75_1$ of the snubber module $70_1$ or the first coupling terminal $75_3$ of the snubber module $70_3$ in this embodiment).

The fourth diode $714_2$ is provided along the path joining the first node 721 and the negative-side snubber terminal 72 with the second node 722 interposed. The fourth diode $714_2$ may allow current to flow in the direction from the negative-side terminal 52 to the positive-side terminal 51 and serves as the discharge path diode 221. For example, the fourth diode $714_2$ allows current to flow in the direction from the negative-side terminal 52 to the positive-side capacitor 211 in this embodiment.

Note that the second diode 712 may be additionally provided between the first coupling terminal $75_2$ and the second node 722 to which the first coupling terminal $75_2$ is connected, where the second diode 712 allows current to flow in the direction from the negative-side terminal 52 to the positive-side terminal 51. The first coupling terminal $75_2$ may be externally connected to the second diode 712.

2-3. Configuration Example (3)

FIG. 6 shows the snubber module $70_3$ according to the third configuration example. The snubber module $70_3$ is alone used in the snubber apparatus 7, or is connected to the downstream side of the snubber modules $70_1$ and $70_2$ (for example, the right side of the figure in this embodiment). Note that description of configuration similar to those of the snubber modules $70_1$ and $70_2$ is omitted as appropriate.

The snubber module $70_3$ has the first coupling terminal $75_3$ and a fourth diode $714_3$. For example, the first coupling terminal $75_3$ is directly or indirectly connected to the first node 721 located between the positive-side capacitor 211 and the first diode 711 in this embodiment. For example, the first coupling terminal $75_3$ is indirectly connected to the first node 721 via the second diode 712 in this embodiment. Note that the second diode 712 may not necessarily be included in the snubber module $70_3$. The second diode 712 may be externally connected to the first coupling terminal $75_3$.

The first coupling terminal $75_3$, which is a negative-side coupling terminal, may be connected to the negative-side terminal 52. Further, when the plurality of snubber modules 70 are connected in a cascade manner, the first coupling terminal $75_3$ may be connected to the positive-side coupling terminal of another snubber module 70 (for example, the second coupling terminal 76 of the snubber module $70_1$ or the first coupling terminal $75_2$ of the snubber module $70_2$ in this embodiment).

The fourth diode $714_3$ is provided along the path joining the second node 722 and the positive-side snubber terminal 71 with the first node 721 interposed. The fourth diode $714_3$ may allow current to flow in the direction from the negative-side terminal 52 to the positive-side terminal 51 and serves as the discharge path diode 221. For example, the fourth diode $714_3$ allows current to flow in the direction from the negative-side capacitor 213 to the positive-side terminal 51 in this embodiment.

In each of the snubber modules $70_1$ to $70_3$ above, the positive-side capacitor 211, the first diode 711 and the negative-side capacitor 213 are sequentially connected between the positive-side snubber terminal 71 and the negative-side snubber terminal 72. Accordingly, by connecting the positive-side snubber terminal 71 to the positive-side terminal 51 of the semiconductor module 5 and the negative-side snubber terminal 72 to the negative-side terminal 52 of the semiconductor module 5, the charge path 21 for charging the positive-side capacitor 211 and the negative-side capacitor 213 from the positive-side terminal 51 and the negative-side terminal 52 is formed using the corresponding snubber module 70.

Further, the first coupling terminals $75_1$ to $75_3$ each connected to the first node 721 or the second node 722 are provided in a manner enabling external connection, so that the discharge paths 22 are formed of which the quantity is greater than that of the snubber modules 70 and which provide the discharge from at least one of the positive-side capacitor 211 and the negative-side capacitor 213 to the positive-side terminal 51 and the negative-side terminal 52 using the respective snubber modules 70, by connecting the first coupling terminals $75_1$ to $75_3$ to the positive-side terminal 51 or the negative-side terminal 52, or to the first coupling terminals $75_1$ to $75_3$ or the second coupling terminal 76 of the other snubber modules 70.

For example, when the snubber module $70_2$ is alone used and the first coupling terminal $75_2$ is connected to the positive-side terminal 51, two discharge paths are formed, which are the discharge path 22 from the negative-side snubber terminal 72 which passes the fourth diode 714 and the positive-side capacitor 211 in this order, and the discharge path 22 from the negative-side snubber terminal 72 which passes the negative-side capacitor 213 and the first coupling terminal $75_2$ in this order. Also, when the snubber module $70_3$ is alone used and the first coupling terminal $75_3$ is connected to the negative-side terminal 52, two discharge paths are formed, which are the discharge path 22 from the negative-side snubber terminal 72 which passes the negative-side capacitor 213 and the fourth diode 714 in this order, and the discharge path 22 from the first coupling terminal $75_3$ which passes the second diode 712 and the positive-side capacitor 211 in this order.

Therefore, the snubber circuit 2 can be made up of the one or more snubber modules 70. Thus, the snubber circuit 2 in which the plurality of devices are connected can be readily assembled for attachment.

The first diode 711 allows current to flow in the direction from the positive-side terminal 51 to the negative-side terminal 52, enabling current to flow in the charge path 21 when the semiconductor module 5 cuts current off, and enabling the charge path 21 to be cut off when the semiconductor module 5 applies current.

Also, the second diode 712 which allows current to flow in the direction from the negative-side terminal 52 to the positive-side terminal 51 is provided between the first node 721 and the first coupling terminal 75, enabling current to flow in the discharge path 22 when the semiconductor module 5 applies current, and enabling the charge path 21 to be cut off when the semiconductor module 5 cuts current off.

Further, the snubber module $70_1$ includes the second coupling terminal 76 directly or indirectly connected to the second node 722, so that any number of snubber modules 70 can be coupled in a cascade manner to form the snubber apparatus 7 by connecting the second coupling terminal 76 to the first coupling terminal 75 of the other snubber module $70_1$ or $70_3$.

In addition, the snubber module $70_2$ includes the fourth diode $714_2$ which is provided along the path joining the first node 721 and the negative-side snubber terminal 72 with the second node 722 interposed, and which allows current to flow in the direction from the negative-side terminal 52 and the positive-side terminal 51, and the snubber module $70_3$ includes the fourth diode $714_3$ which is provided along the path joining the second node 722 and the positive-side snubber terminal 71 with the first node 721 interposed and which allows current to flow in the direction from the negative-side terminal 52 to the positive-side terminal 51. Accordingly, when the semiconductor module 5 applies current, the current allows to flow through the discharge path 22, and when the semiconductor module 5 cuts current off, the charge path 21 can be cut off.

2-4. Configuration of Snubber Module 70 in Appearance

Figure 7:
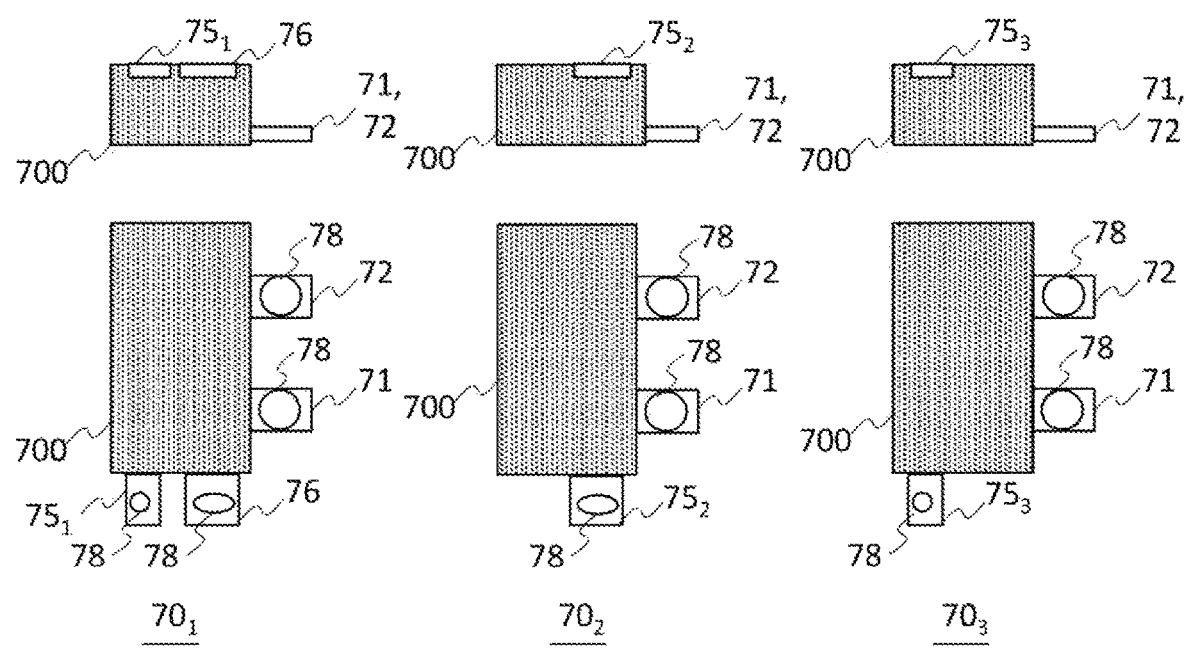
FIG. 7 shows the appearances of the snubber modules $70_1$ to $70_3$.

FIG. 7 shows the appearance of the snubber modules $70_1$ to $70_3$. Note that the upper and lower portions of the figure show the configuration of the snubber module 70 in appearance as seen from different directions. For example, the upper portion of the figure shows the appearance of the snubber module 70 as seen from lateral side, and the lower part of the figure shows the appearance of the snubber module 70 as seen from above in this embodiment.

Each snubber module 70 has the flat cuboid-shaped housing 700, has at least the positive-side capacitor 211, the first diode 711 and the negative-side capacitor 213 inside the housing 700, and has the positive-side snubber terminal 71, the negative-side snubber terminal 72 and the first coupling terminal 75 outside the housing 700. The snubber module $70_1$ further has the second coupling terminal 76.

Among these, the positive-side snubber terminal 71 and the negative-side snubber terminal 72 are provided to protrude from one of the side surfaces of the housing 700. The distance between the positive-side snubber terminal 71 and the negative-side snubber terminal 72 may be equal to the distance from the positive-side terminal 51 and the negative-side terminal 52 in the semiconductor module 5. The positive-side snubber terminal 71 and the negative-side snubber terminal 72 may be provided to be closer to the semiconductor module 5 (for example, in this embodiment, the lower side of the side view shown in the upper part of the figure) than the central point of the housing 700.

The positive-side snubber terminal 71 and the negative-side snubber terminal 72 may each have a hole 78 through which a screw is inserted. The hole 78 may be a cutout portion.

The first coupling terminal 75 and the second coupling terminal 76 are provided to protrude from any of other side surfaces of the housing 700 than the side surface from which the positive-side snubber terminal 71 and the negative-side snubber terminal 72 protrudes. The first coupling terminal 75 and the second coupling terminal 76 may be provided to be more distant from the semiconductor module 5 (for example, in this embodiment, the upper side of the side view shown in the upper part of the figure) than the central point of the housing 700. In this way, the interference with the positive-side snubber terminal 71 and the negative-side snubber terminal 72 can be prevented when the first coupling terminal $75_2$ is connected to the first coupling terminal $75_1$ and when the second coupling terminal 76 is connected to the first coupling terminal $75_3$.

The first coupling terminal 75 and the second coupling terminal 76 may each have a hole 78 through which a screw is inserted. The hole 78 may be a cutout portion.

Note that such a snubber module 70 may be manufactured through a so-called insert molding process. With this molding process, the snubber module 70 can be manufactured by, for example, pouring resin into a mold for set after the elements and devices such as the positive-side capacitor 211, the first diode 711 and the negative-side capacitor 213, and the terminals such as the positive-side snubber terminal 71, the negative-side snubber terminal 72 and the first coupling terminal 75 are arranged in the mold for giving a shape.

The terminals of the above snubber module 70 has holes 78 or the cutout portions, allowing the snubber module 70 to be readily fixed to the semiconductor module 5 or a wiring bar.

Also, the positive-side snubber terminal 71 and the negative-side snubber terminal 72 is provided to be closer to the semiconductor module 5 (for example, in this embodiment, the lower side) than the central point of the housing 700, allowing a smaller wiring inductance between the positive-side terminal 51 and the negative-side terminal 52 of the semiconductor module 5 and the positive-side snubber terminal 71 and the negative-side snubber terminal 72. Accordingly, voltage overshoot caused when the semiconductor module 5 cuts current off can be reduced.

3. Example of How to Connect Snubber Modules 70

Figure 8:
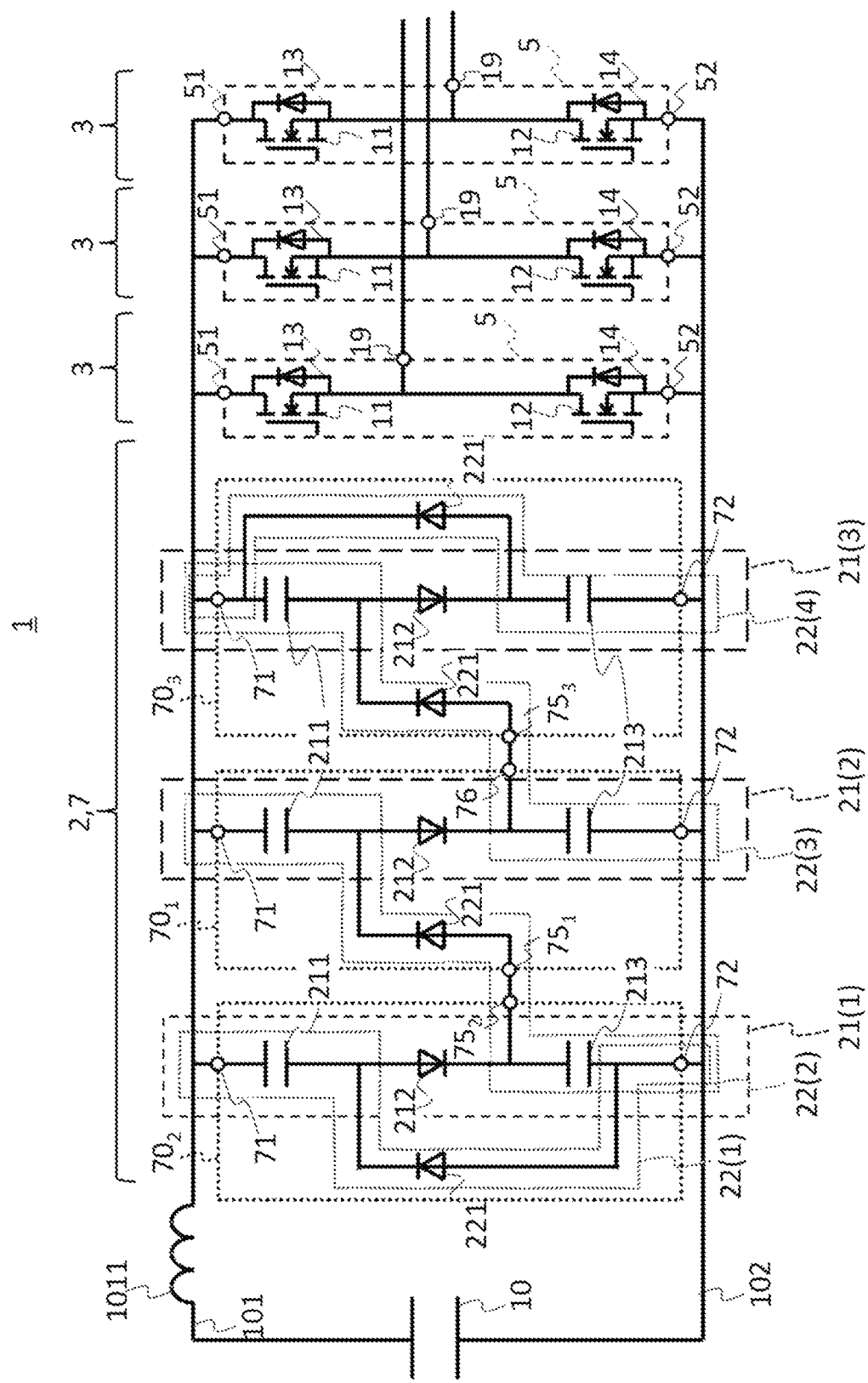
FIG. 8 shows an example of how to connect the snubber modules 70.

FIG. 8 shows an example of how to connect the snubber modules 70.

The snubber circuit 2 shown in FIG. 1 may be formed by using one snubber module $70_1$, one snubber module $70_2$ and one snubber module $70_3$ to connect them. For example, the snubber module $70_2$, the snubber module $70_1$ and the snubber module $70_3$ may be sequentially connected via the first coupling terminals 75 and the second coupling terminals 76. In this embodiment, for example, the snubber circuit 2 is formed by connecting the first coupling terminal $75_2$ of the snubber module $70_2$ to the first coupling terminal $75_1$ of the snubber module $70_1$ and connecting the second coupling terminal 76 of the snubber module $70_1$ to the first coupling terminal $75_3$ of the snubber module $70_3$. Note that the plurality of snubber modules $70_1$ may be connected in a cascade manner between the snubber module $70_2$ and the snubber module $70_3$.

In this context, the wiring inductance of each discharge path 22 in the snubber circuit 2 may be greater than the wiring inductance of each charge path 21. Also, the wire length of each discharge path 22 may be longer than the wire length of each charge path 21. For example, the wire length of each discharge path 22 joining the positive-side terminal 51 and the negative-side terminal 52 may be longer than the wire length of each charge path 21 joining the positive-side terminal 51 and the negative-side terminal 52. Also, the wire length of the wiring portion joining the negative-side capacitor 213 and the positive-side capacitor 211 in each discharge path 22 may be longer than the wire length of the wiring portion between the positive-side capacitor 211 and the negative-side capacitor 213 in each charge path 21. In this embodiment, for example, each charge path 21 may be arranged linearly between the positive-side terminal 51 and the negative-side terminal 52. Also, a part of the discharge path 22 that is between the first coupling terminal $75_2$ and the first coupling terminal $75_1$ or between the second coupling terminal 76 and the first coupling terminal $75_3$ may be formed of a wire in a loop or the like.

In this case, voltage overshoot caused when the semiconductor module 5 cuts current off is reduced, and at the same time, the peak of discharge current can be suppressed when the semiconductor module 5 applies current.

4. Configuration of Semiconductor Apparatus 1 in Appearance

Figure 9:
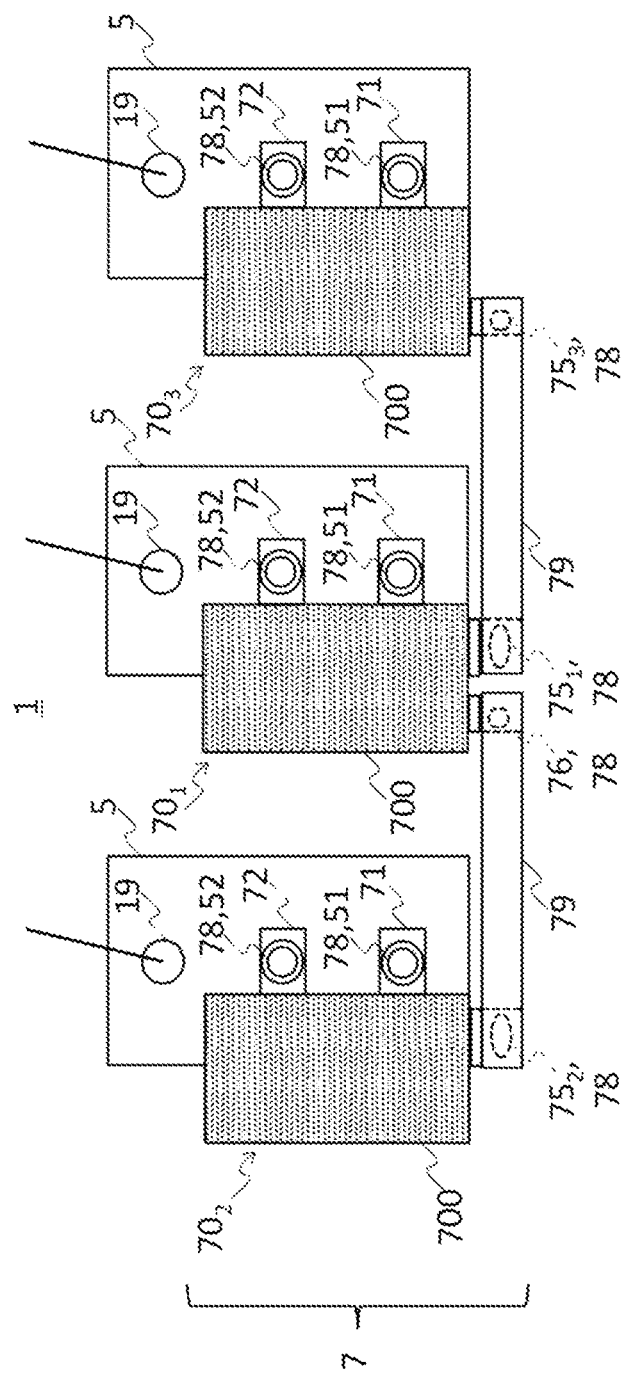
FIG. 9 shows a configuration of the power conversion apparatus 1 in appearance.

FIG. 9 shows a configuration of the semiconductor apparatus 1 in appearance. The semiconductor apparatus 1 includes three semiconductor modules 5 and a snubber apparatus 7.

Each semiconductor module 5 may incorporate the switching devices 11 and 12 and the freewheeling diodes 13 and 14. Each semiconductor module 5 may also have the positive-side terminal 51, the negative-side terminal 52 and the power output terminal 19 on its outer surface. One or more capacitors 10, which are not shown in the figure, may be connected to the positive-side terminal 51 and the negative-side terminal 52. Each semiconductor module 5 may further have one or more control terminals, which are not shown in the figure.

The snubber apparatus 7 is made up of the three snubber modules 70 associated with the respective semiconductor modules 5 on a one-to-one basis. The positive-side snubber terminal 71 and the negative-side snubber terminal 72 of each snubber module 70 are connected to the positive-side terminal 51 and the negative-side terminal 52 of the semiconductor module 5 by inserting screws into the holes 78. The first coupling terminal $75_2$ and the first coupling terminal $75_1$ are connected to one wiring bar 79 by inserting the screws into the holes 78. The second coupling terminal 76 and the first coupling terminal $75_3$ are connected to another wiring bar 79 by inserting the screws into the holes 78.

5. Variation

Figure 10:
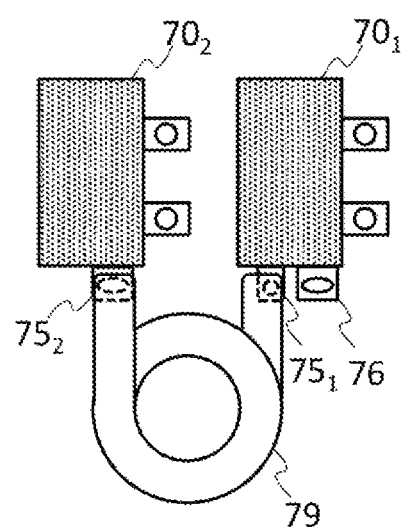
FIG. 10 shows a variation of a wiring bar 79.

FIG. 10 shows a variation of the wiring bar 79. The snubber modules 70 may be connected with the loop-shaped wiring bar 79. This case ensures that the wiring inductance of each discharge path 22 can be greater than the wiring inductance of each charge path 21. Accordingly, the peak of discharge current can be suppressed when the semiconductor module 5 applies current.

Figure 11:
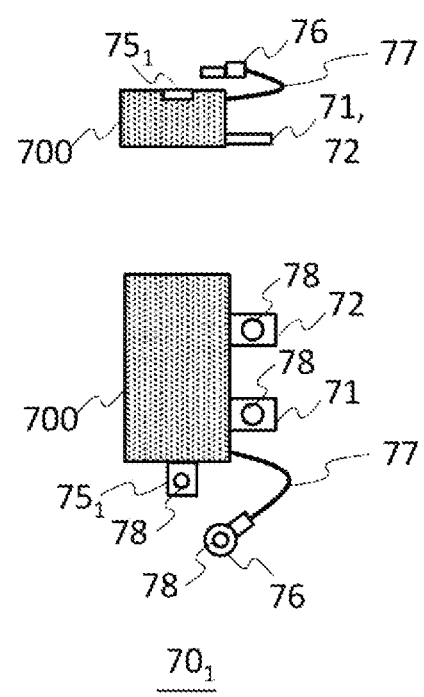
FIG. 11 shows variations of a first coupling terminal 75 and a second coupling terminal 76.

FIG. 11 is a variation of the first coupling terminal 75 and the second coupling terminal 76. At least one of the first coupling terminal 75 and the second coupling terminal 76 may be pulled out of the housing 700 via an electric wire 77. For example, the second coupling terminal 76 in FIG. 11 is pulled out via the electric wire 77.

Figure 12:
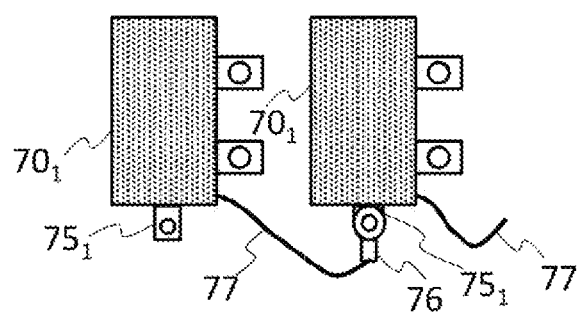
FIG. 12 shows an example of how to connect the snubber modules $70_1$.

FIG. 12 shows an example of how to connect the snubber modules $70_1$. When the second coupling terminal 76 is pulled out via the electric wire 77, the second coupling terminal 76 may be connected to the first coupling terminal $75_1$ of the downstream snubber module $70_1$ instead of using the wiring bar 79. Accordingly, connection between the snubber modules 70 can be facilitated.

Figure 13:
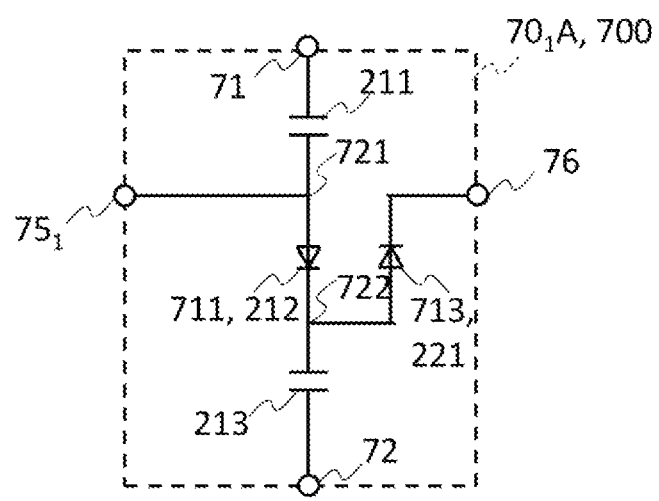
FIG. 13 shows a snubber module $70_1$A according to a variation.

FIG. 13 shows a snubber module $70_1A$ according to a variation. The snubber module $70_1A$ may be used instead of the snubber module $70_1$. The snubber module $70_1A$ has a third diode 713 provided between the second node 722 and the second coupling terminal 76, alternatively or additionally to the second diode 712. The third diode 713 may allow current to flow in the direction from the negative-side terminal 52 to the positive-side terminal 51, and serves as the discharge path diode. This allows current to flow through the discharge path 22 when the semiconductor module 5 applies current, and allows the charge path 21 to be cut off when the semiconductor module 5 cuts current off. Note that when the snubber module $70_1A$ is used, the snubber module $70_3$ connectable to that snubber module $70_1A$ may not have the second diode 712.

6. Another Variation

Note that although the semiconductor apparatus 1 in the above embodiment and variation is deemed a power conversion apparatus for converting DC power to AC power for description, it may be a power conversion apparatus for converting AC power to DC power, or may be a power conversion apparatus for converting frequencies and phases, voltages, the number of phases, etc. Further, the semiconductor apparatus 1 may not convert power as long as it performs switching in the semiconductor module 5.

Although the numbers of the semiconductor modules 5 and the snubber modules 70 are each deemed three for description, another number of the semiconductor modules and another number of the snubber modules may be set independent to each other. When the semiconductor apparatus 1 includes a plurality of semiconductor module 5, the semiconductor modules 5 may be connected in series or may be connected in parallel. The number of the snubber modules 70 may be fewer or more than that of the semiconductor modules 5. In those cases, the snubber modules 70 may not be directly connected to the semiconductor modules 5, for example, may be connected to the semiconductor modules 5 via a wiring bar connected to the positive-side terminals 51 and the negative-side terminals 52 of the semiconductor modules 5.

Although the first coupling terminal 75 and the second coupling terminal 76 in the above embodiment are deemed to be provided to protrude from one side surface of the housing 700 for description, those terminals may be provided to be exposed on a side surface or an upper surface of the housing 700.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: semiconductor apparatus, 2: snubber circuit, 3: switching circuit, 5: semiconductor module, 7: snubber apparatus, 10: capacitor, 11: switching device, 12: switching device, 13: freewheeling diode, 14: freewheeling diode, 19: power output terminal, 21: charge path, 22: discharge path, 51: positive-side terminal, 52: negative-side terminal, 70: snubber module, 71: positive-side snubber terminal, 72: negative-side snubber terminal, 75: first coupling terminal, 76: second coupling terminal, 77: electric wire, 78: hole, 79: wiring bar, 101: positive-side power supply line, 102: negative-side power supply line, 211: positive-side capacitor, 212: charge path diode, 213: negative-side capacitor, 221: discharge path diode, 700: housing, 701: snubber module, 702: snubber module, 703: snubber module, 711: first diode, 712: second diode, 713: third diode, 714: fourth diode, 721: first node, 722: second node, 1011: wiring inductance

What is claimed is:

1. A snubber apparatus attachable to a terminal of a semiconductor module, the snubber apparatus comprising:
   at least one first snubber module and at least one second snubber module, each including:
      a positive-side capacitor, a first diode and a negative-side capacitor sequentially connected between a positive-side snubber terminal and a negative-side snubber terminal, the positive-side snubber terminal being connectable to a positive-side terminal of the semiconductor module, and the negative-side snubber terminal being connectable to a negative-side terminal of the semiconductor module;
      a first coupling terminal directly or indirectly connected to one node of either a first node or a second node, the first node being located between the positive-side capacitor and the first diode, and the second node being located between the negative-side capacitor and the first diode; and
      a housing accommodating the positive-side capacitor, the negative-side capacitor and the first diode, and having provided therein the positive-side snubber terminal, the negative-side snubber terminal and the first coupling terminal in a manner enabling external connection, wherein
   the at least one second snubber module further includes a second coupling terminal directly or indirectly connected to another node of the first node and the second node that is different from the one node,
   the positive-side snubber terminal and the negative-side snubber terminal of each of the at least one first snubber module and the at least one second snubber module are provided on one surface of the respective housing of the at least one first snubber module and the at least one second snubber module, the one surface facing a first direction,
   wherein the first coupling terminal and the second coupling terminal each are a coupling terminal, and the at least one first snubber module and the at least one second snubber module each are a snubber module, wherein
   the snubber modules are sequentially connected by connecting nearest of the coupling terminals of snubber modules adjacent one another, and
   the coupling terminals being provided on another surface of the respective housing of the snubber modules, the another surface facing a second direction that is different from the first direction.

2. A snubber apparatus attachable to a terminal of a semiconductor module, the snubber apparatus comprising:
   at least one first snubber module and at least one second snubber module, each including:
      a positive-side capacitor, a first diode and a negative-side capacitor sequentially connected between a positive-side snubber terminal and a negative-side snubber terminal, the positive-side snubber terminal being connectable to a positive-side terminal of the semiconductor module, and the negative-side snubber terminal being connectable to a negative-side terminal of the semiconductor module;

a first coupling terminal directly or indirectly connected to one node of either a first node or a second node, the first node being located between the positive-side capacitor and the first diode, and the second node being located between the negative-side capacitor and the first diode; and a housing accommodating the positive-side capacitor, the negative-side capacitor and the first diode, and having provided therein the positive-side snubber terminal, the negative-side snubber terminal and the first coupling terminal in a manner enabling external connection, a plurality of charge paths parallel to one another and each allowing current to flow in a direction from the positive-side terminal to the negative-side terminal; and a plurality of discharge paths parallel to one another and each allowing current to flow in a direction from the negative-side terminal to the positive-side terminal, and a wiring inductance of each discharge path is greater than a wiring inductance in each charge path, wherein the at least one second snubber module further includes a second coupling terminal directly or indirectly connected to another node of the first node and the second node that is different from the one node, the respective snubber modules are sequentially connected via the first coupling terminal and the second coupling terminal.

3. The snubber apparatus according to claim 2, wherein at least one of the at least one first snubber module and the at least one second snubber module further includes a second diode provided between the one node and the first coupling terminal and allowing current to flow in a direction from the negative-side terminal to the positive-side terminal.

4. The snubber apparatus according to claim 2, wherein the at least one first snubber module further includes a second coupling terminal directly or indirectly connected to another node of the first node and the second node that is different from the one node.

5. The snubber apparatus according to claim 4, wherein at least one of the at least one first snubber module and the at least one second snubber module further includes a third diode provided between the other node and the second coupling terminal and allowing current to flow in a direction from the negative-side terminal to the positive-side terminal.

6. The snubber apparatus according to claim 4, wherein at least one of the first coupling terminal and the second coupling terminal is pulled out of the housing via an electric wire.

7. The snubber apparatus according to claim 2, wherein at least one of the at least one first snubber module and the at least one second snubber module further includes a fourth diode provided along a path joining another node and the positive-side snubber terminal or the negative-side snubber terminal with the one node interposed, and allowing current to flow in a direction from the negative-side terminal to the positive-side terminal, the other node being one of the first node and the second node that is different from the one node.

8. A power conversion apparatus comprising:
the semiconductor module; and
the snubber apparatus according to claim 2.

9. The snubber apparatus according to claim 2, wherein at least part of the plurality of discharge paths are connected by a loop-shaped wiring bar.

* * * * *